United States Patent [19]

Balocke

[11] Patent Number: 5,407,165

[45] Date of Patent: Apr. 18, 1995

[54] INNER MEMORY SLIDE FOR ADJUSTING A VEHICLE SEAT, THE INNER MEMORY COOPERATING WITH THE FIXED PROFILE MEMBER OF THE SLIDE

[75] Inventor: Francis Balocke, Flers, France

[73] Assignee: Bertrand Faure Automobile "BFA, Massy, France

[21] Appl. No.: 126,161

[22] Filed: Sep. 22, 1993

[30] Foreign Application Priority Data

Sep. 22, 1992 [FR] France .................. 92 11253

[51] Int. Cl.6 ............................................. F16M 13/00
[52] U.S. Cl. ............................ 248/429; 297/344.1; 248/430; 248/424
[58] Field of Search ................ 248/429, 424, 430; 297/344.1, 340; 296/65.1

[56] References Cited

U.S. PATENT DOCUMENTS

| | | | |
|---|---|---|---|
| 3,711,056 | 1/1973 | Gmeiner et al. | 248/429 |
| 3,897,101 | 7/1975 | Herz | 248/429 X |
| 4,648,657 | 3/1987 | Cox et al. | |
| 4,671,571 | 6/1987 | Gionet | |
| 4,781,354 | 11/1988 | Nihei et al. | 248/424 |
| 4,881,774 | 11/1989 | Bradley et al. | |

FOREIGN PATENT DOCUMENTS

| | | |
|---|---|---|
| 0411850 | 2/1991 | European Pat. Off. |
| 2378649 | 8/1978 | France . |
| 2430330 | 2/1980 | France . |
| 2623451 | 5/1989 | France . |
| 2656262 | 6/1991 | France . |
| 58-20529 | 2/1983 | Japan . |
| 58-26644 | 2/1983 | Japan . |
| 57-134341 | 8/1992 | Japan . |
| 754290 | 8/1956 | United Kingdom . |
| 2234431 | 2/1991 | United Kingdom . |

*Primary Examiner*—Alvin C. Chin-Shue
*Assistant Examiner*—Korie H. Chan
*Attorney, Agent, or Firm*—Robert W. Becker & Associates

[57] ABSTRACT

The inner memory comprises an arm with a rear nose and a front notch and is at rest in an inner lower portion of the fixed lower profile member. The lower fixed profile member has a first inner toothing for cooperating with the rear nose of the memory. A first L-shaped lever ending into a nose is articulated via a first articulation pin on an angle bracket mounted on the mobile upper profile member and has a finger below the first articulating pin. The angle bracket carries a second articulation pin for both an actuating bar and a second L-shaped lever ending into a nose for cooperating with the notch of the memory. The actuating bar is designed to bear on the latch under the effect of the finger of the first L-shaped lever when the first lever is pivoted by a control device. A further control device is provided to pivot the actuating bar and the second L-shaped lever so as to release respectively the latch and the memory simultaneously.

5 Claims, 4 Drawing Sheets or# INNER MEMORY SLIDE FOR ADJUSTING A VEHICLE SEAT, THE INNER MEMORY COOPERATING WITH THE FIXED PROFILE MEMBER OF THE SLIDE

FIELD OF THE INVENTION

The invention relates to an inner memory slide for adjusting the position of vehicle seats.

BACKGROUND OF THE INVENTION

Slides for the longitudinal adjustment of vehicle seats used for positioning each seat in a most comfortable position for a passenger have been known for a long time.

Thus, electrically controlled slides with circuits exist comprising memories for a semiautomatic or automatic adjustment of the seat position according to the respective passenger. Such electrically controlled slides represent an important improvement and are particularly used in top of the line vehicles which may be driven by persons of different morphology, for example, a couple, i.e., husband and wife, so that the seat, particularly that of the driver, can resume a desired position when the vehicle is driven either by the husband or by his wife.

Such electrically controlled devices are costly, and therefore attempts have been made to provide slides having a much simpler mechanical memory. This is the case, for example, with the device according to French specification 2,623,451. But, there again, the design of such an assembly is too costly for inexpensive vehicles having only two doors in which it is necessary, in order to allow passengers in and out of the rear part of the vehicle, to have memory slides which can slide frontwardly toward the steering-wheel and the instrument panel of the vehicle in a simple and rapid manner in order to allow passengers access to the rear seats of such a two-door vehicle.

An object of the present invention is therefore to provide memory slides each including a simple mechanical memory cooperating with the fixed profile member of each slide so as to obtain a unit enabling an adjustment of a longitudinal position of a seat, either the seat of the driver or that of the front passenger, and providing at the same time a simple operation which leaves the memory means in position but permits a practically instantaneous unlocking of the mobile upper profile member of each slide so as to be able to bring forward the respective seat underneath the steering wheel or near the instrument panel, after having folded the back portion onto the seat portion for allowing the rear passengers of a two-door vehicle to enter or leave.

Moreover, the mechanical memory means of the present invention should be positioned inside each slide, thereby considerably reducing the space required on the vehicle floor so that it is thus possible to use the remaining free space for other functions (fixation of a safety belt, a place for a radio set, a telephone set or the like).

SUMMARY OF THE INVENTION

The inner memory slide for adjusting a vehicle seat according to the present invention is primarily characterized by:

A fixed lower profile member having a first and a second toothing;

A mobile upper profile member for receiving a vehicle seat, the mobile upper profile member being slidably connected to the fixed lower profile member and having a pivotable latch with a comb toothing;

The comb toothing of the latch, in the latched position, engaging the second toothing of the lower fixed profile member for arresting the mobile upper profile member at the lower fixed profile member;

A memory means for longitudinally adjusting the mobile upper profile member relative to the lower fixed profile member by engaging and releasing said first toothing, the memory means comprising an arm with a rear nose and a front notch, wherein the rear nose cooperates with the first toothing;

An angle bracket mounted on the mobile upper profile member and having a first and a second articulation pin;

A first L-shaped lever fixedly connected with a first end to the first articulation pin and having a finger connected to the first end under the articulation pin, the L-shaped lever having a nose-shaped second end;

A second L-shaped lever fixedly connected to the second articulation pin and having a free end in the form of a nose that cooperates with the front notch of the memory means for releasing the rear nose from the first toothing;

An actuating bar fixedly connected to the second articulation pin;

A first control means for pivoting the second L-shaped lever and the actuating bar from a rest position into a release position for releasing the memory means from the first toothing and the latch from the second toothing; and A second control means for pivoting the first L-shaped lever so as to activate with the finger the actuating bar for releasing the latch from the second toothing.

In a preferred embodiment of the present invention, the latch comprises a spring for returning it into the latched position after release of the first control means, thereby also returning the second L-shaped lever and said actuating bar into their rest position.

Preferably, the second control means is activated by folding a back portion of the vehicle seat onto its seat portion such that the second control means pivots the first L-shaped lever so as to activate with the finger the actuating bar.

Expediently, the memory means has a zone with a front end and the nose-shaped second end engages the front end for returning the first L-shaped lever upon release of the second control means.

In a further embodiment of the present invention, the memory means is positioned partially inside the slide and partially on an inner face of the slide.

According to the invention, the inner memory slide comprises a mobile upper profile member and a fixed lower profile member, with a latch articulated on the mobile upper profile member. The latch comprises a comb toothing for cooperating with a second toothing of the fixed lower profile member in order to latch the same. A memory means cooperating with the fixed lower profile member of the slide is provided for longitudinally adjusting a seat mounted on the mobile upper profile member and enabling an unlatching of the mobile upper profile member so as to allow a movement of the same with respect to the fixed lower profile member. The memory means comprises an arm with a rear nose and a front notch and is positioned in an inner lower portion of the fixed lower profile member which has the first inner toothing for cooperating with the rear nose of the memory. A first L-shaped lever has a second end with a nose and is articulated with a first end via a first articulation pin connected to an angle bracket mounted on the mobile upper profile member. It has a finger connected to the first end below its articulation pin. The angle bracket has a second articulation pin to which both an actuating bar and a second L-shaped lever are connected. The second L-shaped lever ends in a nose for cooperating with the front notch of the memory means. The actuating bar bears on the latch for releasing the latch, when the first control means pivots the actuating bar and the second L-shaped lever so as to allow release of the latch and of the memory. A second control means pivots the first L-shaped lever 50 that under the effect of the finger of the first L-shaped lever the actuating connecting bar so as to allow releases only of the latch.

According to another feature of the invention, the latch comprises a spring facilitating, after release of the first control means, the latching of the mobile upper profile member with respect to the fixed lower profile member such that the second lever and the actuating bar are returned into their rest position.

Various other features of the invention will become more apparent from the following detailed description with the aid of the accompanying drawings.

BRIEF DESCRIPTION OF THE DRAWINGS

Embodiments of the invention are shown by way of non-limiting examples in the accompanying drawings, wherein.

DESCRIPTION OF PREFERRED EMBODIMENTS

The drawings show a single slide and the members related thereto. It is understood that in almost all cases each vehicle seat comprises two longitudinal similar slides placed under the seat on the right and on the left, and that the elements controlling the latching of the upper profile members to the memory or memories of the slide are coordinated with pins connecting them.

For a better understanding of the invention, the following description refers therefore only to a single slide and its element, the other slide and its memory latching elements being identical.

Figure 1:
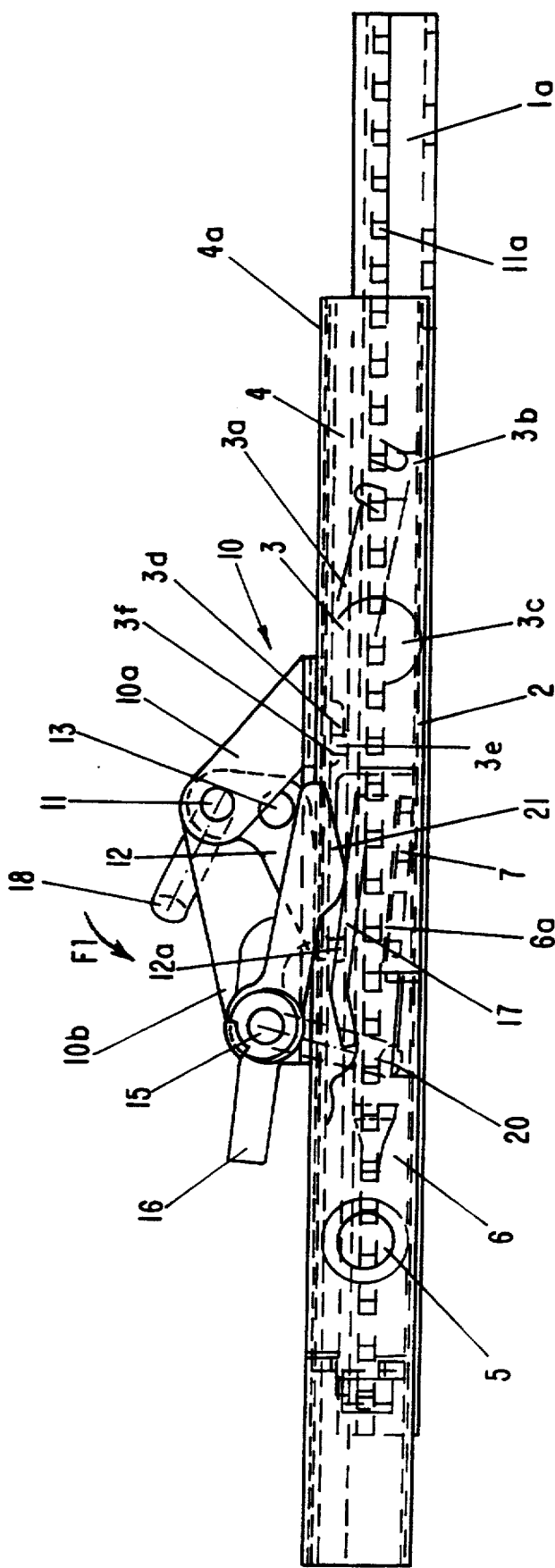
FIG. 1 is a side elevational view showing the elements of the memory slide according to the invention in the position they have when one of the front seats of a vehicle is moved forward underneath the steering wheel or the instrument panel in order to allow access to the rear seat.

In FIG. 1, there is diagrammatically shown the lower profile member 1a of a slide, the profile member 1a being attached to the vehicle floor either on the right or on the left of the respective vehicle seat which, during normal use, has to be latched and can be unlatched and moved for position adjustment.

The bottom of the lower profile member 1a is provided with first inner toothing 2 for cooperating with a memory means 3 placed partly inside the slide and partly on the inner face of the slide. The memory means 3 is made of an arm 3a ending, at its rear portion, in a rear nose 3b and having, in its central zone, a circular portion 3c bearing inside the fixed lower profile member 1a.

In order to facilitate the understanding of the invention, the balls and rods for guiding the mobile upper profile member 4 with respect to the fixed lower profile member 1a are not shown in the drawings. As is conventional, there is provided on one of the sides of the mobile upper profile member 4, in a front zone of the same, a pin 5 on which is mounted a latch 6 provided, in its rear portion 6a, with a comb toothing 7 for cooperating with a second toothing 11a at the corresponding side of the fixed lower profile member 1a so that the mobile upper profile member 4 can be rigidly connected with the fixed lower profile member 1a by engagement of the comb toothing 7 with the second toothing 11a of the fixed lower profile member 1a. This mounting is a standard design as is the spring biasing the latch 6 in its latching or arresting position within the toothing 11a of the fixed lower profile member 1a.

The upper face 4a of the mobile upper profile member 4 carries an angle bracket 10 having a vertical side portion 10a which has a hole through which passes an articulation pin 11 for rotation of a first L-shaped lever 12, connected fixedly with a first end to the pin 11 and ending in a nose-shaped second end (nose) 12a. The lever 12 has a finger 13 connected to the first end underneath the pin 11.

The front end 10b of the angle bracket 10 carries an articulation pin 15 to which is attached a reversed L-shaped second lever 16 having a nose 17.

Reference number 18 designates a hand control device (second control means) for the first lever 12, while 20 designates a hand control device (first control means) for the second lever 16. Finally, an actuating bar 21 is mounted on the pin 15.

Figure 2:
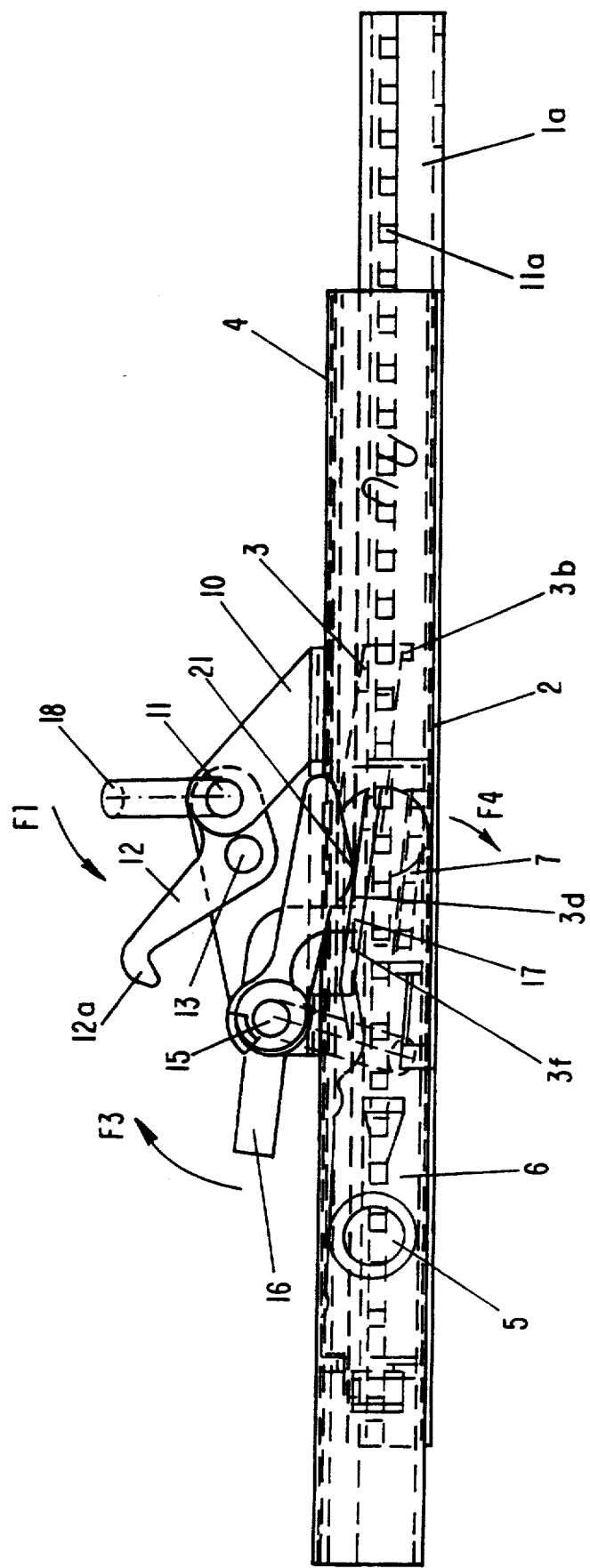
FIG. 2 is a side elevational view corresponding to FIG. 1 showing the elements of the memory slide in the position they have when the upper profile member of the memory slide is free and its memory is disengaged so as to permit a position adjustment of a seat in order to reach a position of maximum comfort for the respective passenger.

In FIG. 2, the memory means 3 is shown in its unlatched position, in which its rear nose 3b is not interlocked with the first toothing 2 of the fixed lower profile member 1a. A movement of the lever 16, in direction of the arrow F3, effected by means of the hand control device 20, causes a pivoting of the pin 15, resulting in the nose 17 pivoting the memory 3 thereby releasing the rear nose 3b of the memory 3 from the toothing 2. Moreover, the actuating bar 21, also connected to the pin 15, by pressing strongly on top of the latch 6, brings the latch 6 down in direction of the arrow F4 and disengages the comb toothing 7 from the second toothing 11a at the fixed lower profile member 1a. The nose 17 of the lever 16 engages the notch 3d of the memory 3 thus enabling movement of the memory 3 from front to rear.

Thus, in the position of FIG. 2, the memory 3 and the latch 6 are released, and it is possible to adjust at will the position of the respective seat according to the morphology of the person sitting on the seat, be it the driver or the passenger.

Figure 3:
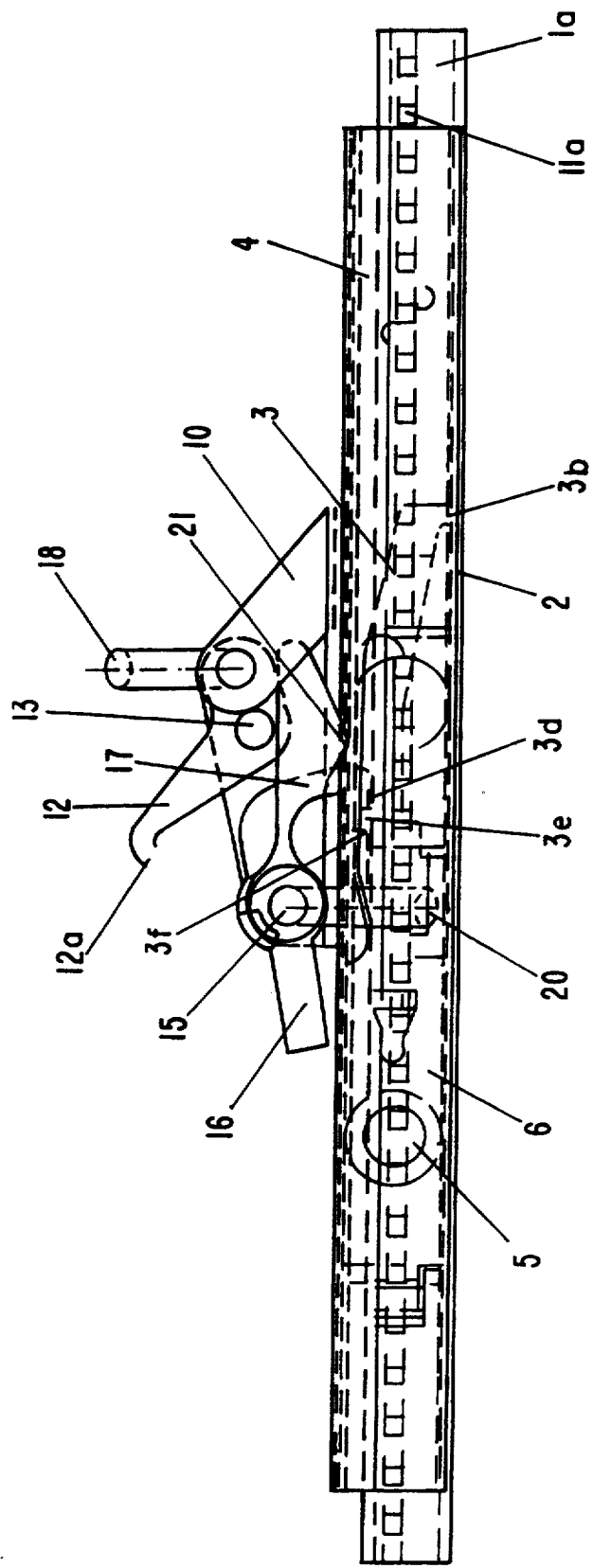
FIG. 3 is an elevational view corresponding to the preceding figures, but showing the position of the members of the memory slide when latched so that the seat is in the position it occupies when in use by the passenger or the driver.
Figure 4:
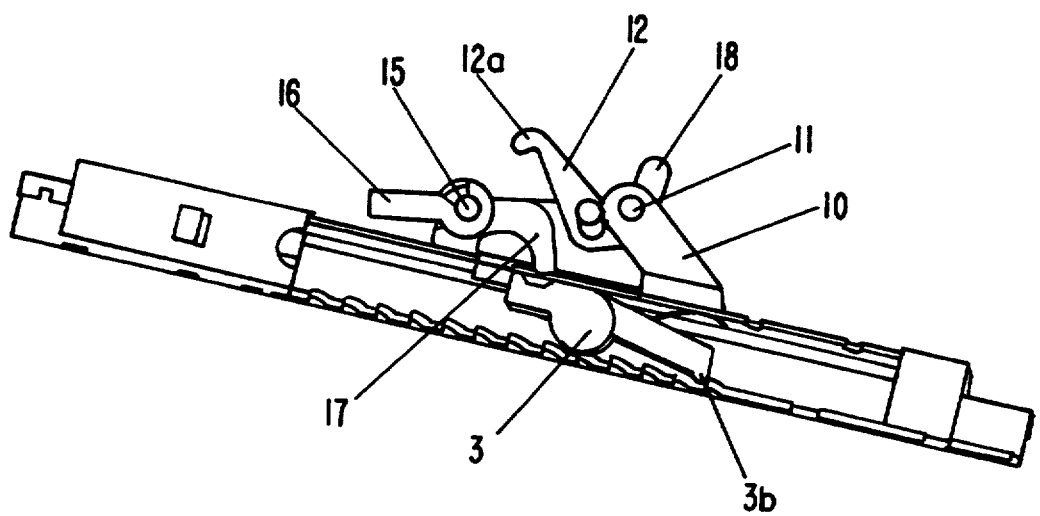
FIG. 4 is a side elevational view of the memory slide at a reduced scale.
Figure 5:
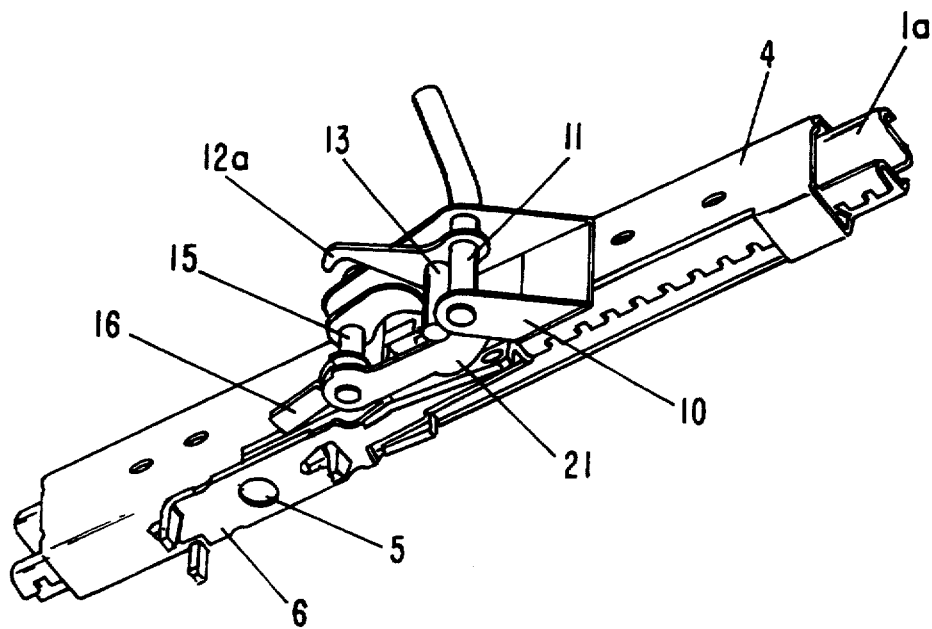
FIG. 5 is a perspective view corresponding to FIG. 4.

When the position chosen by the person sitting on the seat is obtained, the control device 20 is released and, under bias of the spring of the latch 6, the various elements of the slide are brought back to the position shown in FIG. 3. The memory means 3 is latched by the nose 3b engaging the first toothing 2 of the fixed lower profile member 1a. The latch 6 resumes its arresting position by engaging with the comb toothing 7 the second toothing 11a of the fixed lower profile member 1a thereby arresting the mobile upper profile member 4 relative to the fixed lower profile member 1a. The lever 16 is lowered, and the actuating bar 21 is in its rest position. The seat is thus latched in the chosen position.

When it is desired to bring the seat forward in order to provide a sufficient space for the passengers of the rear seats to enter or leave the vehicle, the back portion of the respective seat is pivoted such that the lever 18 (second control means) is moved in direction of arrow F1 (see FIG. 1 and FIG. 2). The resulting movement of the lever 12 will cause (see FIG. 1), via the finger 13 which is rigidly connected to the lever 12, a lowering of the actuating bar 21 which unlatches the latch 6 by disengaging the comb toothing 7 from the second toothing 11a of the fixed lower profile member 1a. Thus, the mobile upper profile member 4 is free with respect to the fixed lower profile member 1a, and it is possible to move the seat forward, either underneath the steering wheel or the instrument panel.

After the vehicle rear passenger(s) have entered the vehicle or have left it, it is sufficient to push the seat rearwardly until the nose-shaped second end 12a of the lever 12 comes into engagement with the front portion 3f of the zone 3e (see FIG. 2), the nose 12a passing laterally through a clearance provided above the zone 3e. The seat thus resumes the position chosen in the beginning by the front passenger or the driver. The back portion of the seat is then brought back to a substantially upright position, and the elements controlled by the lever 18 resume the position shown in FIG. 3.

The present invention is, of course, in no way restricted to the specific disclosure of the specification and drawings, but also encompasses any modifications within the scope of the appended claims.

What I claim is:

1. An inner memory slide for adjusting a vehicle seat, said inner memory slide comprising:
   a fixed lower profile member having a first and a second toothing;
   a mobile upper profile member for receiving a vehicle seat, said mobile upper profile member slidably connected to said fixed lower profile member, said mobile upper profile member having a pivotable latch with a comb toothing;
   said comb toothing of said latch, in a latched position of said latch, engaging said second toothing of said lower fixed profile member for arresting said mobile upper profile member at said lower fixed profile member;
   a memory means for longitudinally adjusting said mobile upper profile member relative to said lower fixed profile member by engaging and releasing said first toothing, said memory means comprising an arm with a rear nose and a front notch, said rear nose cooperating with said first toothing;
   an angle bracket mounted on said mobile upper profile member, said angle bracket having a first and a second articulation pin;
   a first L-shaped lever fixedly connected with a first end to said first articulation pin and having a finger connected to said first end under said articulation pin, said L-shaped lever having a nose-shaped second end;
   a second L-shaped lever fixedly connected to said second articulation pin and having a free end in the form of a nose, said nose cooperating with said front notch of said memory means for releasing said rear nose from said first toothing;
   an actuating bar fixedly connected to said second articulation pin;
   a first control means for pivoting said second L-shaped lever and said actuating bar from a rest position into a release position for releasing said memory means from said first toothing and said latch from said second toothing; and
   a second control means for pivoting said first L-shaped lever so as to activate with said finger said actuating bar for releasing said latch from said second toothing.

2. An inner memory slide according to claim 1, wherein said latch comprises a spring for returning said latch into said latched position after release of said first control means, thereby also returning said second L-shaped lever and said actuating bar into said rest position.

3. An inner memory slide according to claim 1, wherein said second control means is activated by folding a back portion of the vehicle seat onto a seat portion of the vehicle seat such that said second control means pivots said first L-shaped lever so as to activate with said finger said actuating bar.

4. An inner memory slide according to claim 1, wherein said memory means has a zone with a front end and wherein said nose-shaped second end engages said front end for returning said first L-shaped lever upon release of said second control means.

5. An inner memory slide according to claim 1, wherein said memory means is positioned partially inside said slide and partially on an inner face of said slide.

* * * * *